United States Patent [19]

Maloney et al.

[11] Patent Number: 4,762,496
[45] Date of Patent: Aug. 9, 1988

[54] OPHTHALMOLOGIC LENS PHANTOM SYSTEM

[75] Inventors: William F. Maloney, 2020 Ocean Front Ave., Del Mar, Calif. 92014; Deborah K. Hall, 520 I Via de la Valle, Solano Beach, Calif. 92075; Dean B. Parkinson, Redwood City; Orton D. Bergren, Menlo Park; Allen L. Dodge, Newark, all of Calif.

[73] Assignees: William F. Maloney; Deborah K. Hall, both of Del Mar, Calif.

[21] Appl. No.: 14,434

[22] Filed: Feb. 13, 1987

[51] Int. Cl.⁴ ............................................. G09B 23/28
[52] U.S. Cl. ......................................... 434/271; 623/4
[58] Field of Search ................. 434/271, 270; 623/4-6

[56] References Cited

U.S. PATENT DOCUMENTS

| 1,042,815 | 10/1912 | Myers | 434/271 |
|---|---|---|---|
| 3,905,130 | 9/1975 | Gordon et al. | 434/271 |
| 4,136,466 | 1/1979 | Wrue | 434/271 |
| 4,253,199 | 3/1981 | Banko | 623/6 |
| 4,596,528 | 1/1986 | Lewis et al. | 434/270 |

FOREIGN PATENT DOCUMENTS 1082424A  3/1984  U.S.S.R. ............................... 434/271

Primary Examiner—Ronald L. Frinks
Attorney, Agent, or Firm—Knobbe, Martens, Olson & Bear

[57] ABSTRACT

A simulated human ocular system for practicing the surgical techniques required for the removal of cataractous lenses utilizing posterior chamber lens emulsification and, optionally, with the techniques required for small incision implantation is provided. A human eye is generally imitated by an outer orb having three inner, connected chambers separated by membranes that correspond to the corner, the iris, and the posterior chamber membrane. A lens phantom is releasably attached to the orb within the chamber located between the iris and the posterior chamber membrane. The lens phantom consists of a structured, water-sensitive composition, such as a cross-linked gelatin to which a water soluble polymer has been added, and is thereafter encapsulated within a transparent vinyl or vinylidene chloride copolymer film.

17 Claims, 2 Drawing Sheets

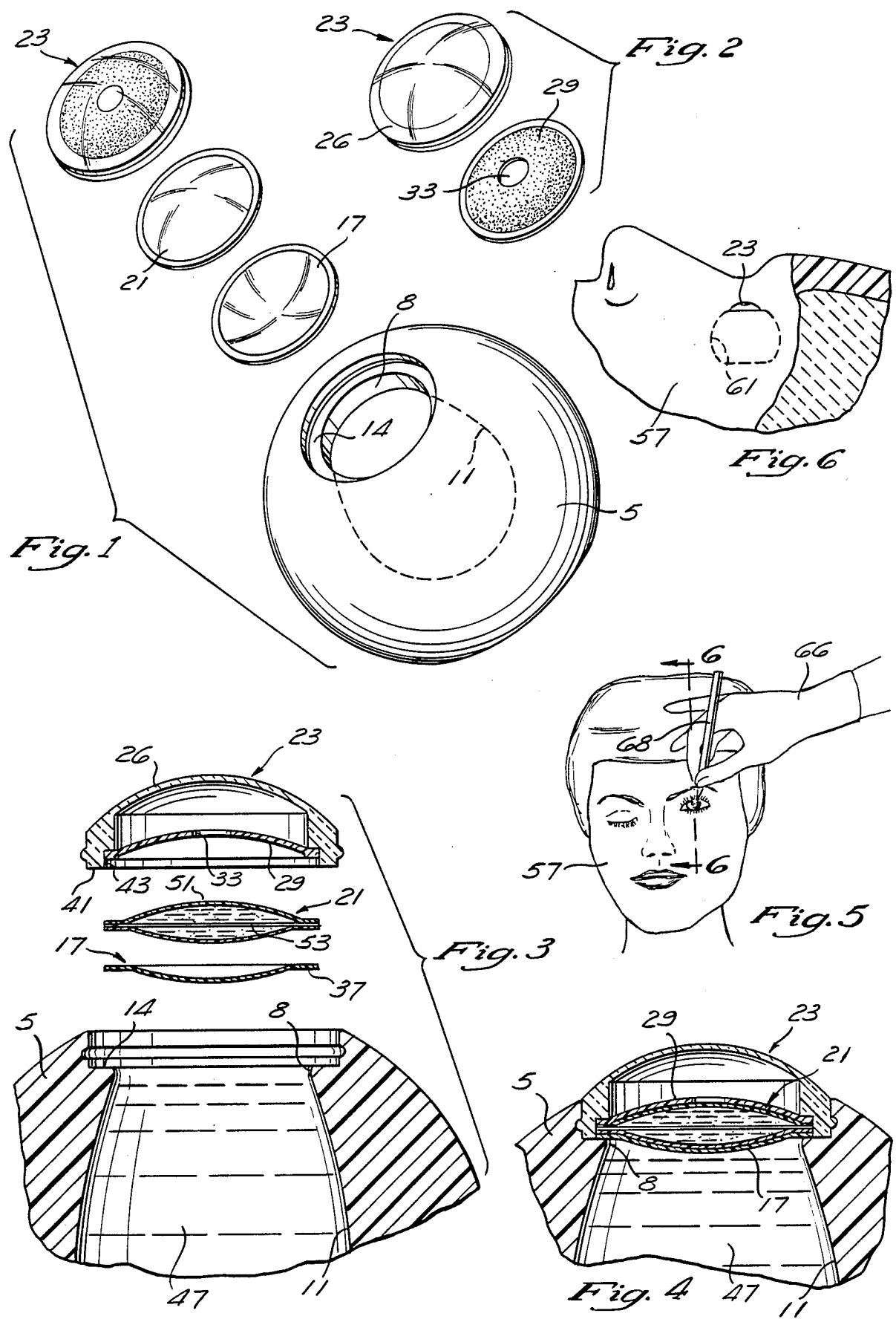

OPHTHALMOLOGIC LENS PHANTOM SYSTEM

BACKGROUND OF THE INVENTION

1. Field of the Invention

The present invention relates to a medical tissue phantom for use in simulating surgical procedures, and more particularly to an ophthalmologic system, wherein a lens tissue phantom is placed within a structure generally resembling a human eye.

2. Description of the Prior Art

The human eye and the eyes of vertebrates in general, although distinguished by a variety of evolutionary modifications, share the same basic anatomical pattern. An anterior, transparent portion, the cornea, is the first ocular component traversed by incoming light, and, for those vertebrates living in air, provides the greatest source of refraction towards focusing the light on the sensory portion of the eye. Inward from the cornea lies the iris, a spongy, circular diaphragm of loose, pigmented connective tissue separating the anterior and posterior chambers. An opening, the pupil, is formed in the center of the iris and enables passage of light energy therethrough. The anterior and posterior chambers are continuous with one another at the pupil, and are filled with a fluid, the aqueous humor. Intraocular pressure created by this fluid normally will maintain the eye in a distended state. A pair of muscles, the dilator and sphincter pupillae, located behind the iris, control the diameter of the pupil and thus the amount of light passing the iris.

Interiorly from the iris, and supported by thin suspensory fibers, termed ciliary zonule, lies the crystalline lens. Surrounded by an elastic capsule, which is attached to the ciliary zonule, the lens is completely cellular, and by altering shape, functions to accommodate or provide ocular adjustments for the sharp focusing of objects viewed at different distances. After passing through the lens, light energy traverses a semisolid, gelatinous vitreous body, and strikes the retina, the Any clouding or opacity of the eye lens is termed a cataract. The degree of cloudiness can vary markedly in cataractous lenses, and may be the result of many causes, although the majority are associated with aging, termed senile cataracts. The essential biochemical change in an affected lens is the sclerosis of its protein, with the primary symptom one of progressively blurred vision. Cataracts are presently the leading cause of adult blindness.

Once a lens is sufficiently clouded so as to impair vision, the only treatment for cataracts is surgical removal. As is discussed in U.S. Pat. No. 4,078,564 to Spina, et al., the Egyptians are believed to be the ones to first surgically treat cataract patients by thrusting a rose thorn through the cornea and pushing the cataractous lens into the vitreous of the eye. In the 1880s, another technique was brought to bear on those senile cataracts that had advanced from the dense, hard phase to the "ripe" or soft and runny phase. Such a progression would frequently occur, over time, and when "ripe", incisions through the cornea and the anterior capsule, would permit the soft material to be flushed out. A major drawback of this procedure was the requirement that the patient wait until the cataract became "ripe", a process that might take 10–20 years, with the patient blind during this entire waiting period.

Beginning in the 1930s, a surgical technique known as Intracapsular Cataract Extraction (ICCE) was introduced, wherein the lens and its surrounding capsule are entirely removed from the eye through a large, 12-to-14 mm incision in the eye. Removal of the posterior portion of the lens capsule under the ICCE technique lays bare the vitreous, which, together with the large incision, may necessitate an extended period of post-surgical care. Additionally, with the posterior lens capsule removed, the posterior chamber implant lenses cannot be used. A subsequently developed surgical technique, Extracapsular Cataract Extraction (ECCE) also requires a large incision in the eye, but results in the removal of only the lens and its anterior covering; the posterior lens covering remains in the eye, protecting the vitreous.

The ICCE and ECCE techniques both require the use of large incisions made in the eye to permit the removal of the lens nucleus or the lens nucleus, the cortex, and the lens capsule, en masse. Beginning in 1967, a new surgical technique was described wherein the lens was fragmented into particles or emulsified by an ultrasonically vibrated tip, while still within the eye. The lens, now emulsified, would thereafter be aspirated from the anterior chamber through an incision in the cornea of much smaller chord length. This new technique, termed "Phacoemulsification" (KPE) by its originator, C. Kelman, provides insertion of the ultrasonically-vibrated tip into the eye through an incision of approximately 3 mm, with the vibrating tip thereafter placed against the cataract. The high frequency vibrations are subsequently used to emulsify the cataract.

As initially taught, the KPE procedure required the prolapse or transfer of the cataract's nucleus into the anterior chamber prior to phacoemulsification. Anterior chamber emulsification is not necessarily safer for the eye. Corneal clarity is maintained in substantial part by an endothelial cell layer that pumps water against an osmotic gradient. This cell layer is apparently unable to repair/replace damaged cells by cell division, and thus when cells are damaged, a burden is placed on the remaining healthy cells to expand and migrate to "fill the void". During the course of cataract surgery, by any method, a proportion of endothelial cells is lost/damaged, primarily through direct or indirect operative trauma. Endothelial cell counts have been made, both pre- and post-operatively, and reported cell losses for anterior chamber phacoemulsification is about 34%, while the ICCE and ECCE techniques reduce this cellular loss to approximately 15%.

The large increase in endothelial cell loss, combined with the challenging maneuvers required to obtain nuclear prolapse, has led to the development of posterior chamber phacoemulsification. In this procedure, after removal of the anterior lens capsule, the central portion of the lens is emulsified, in situ, forming a saucerized nucleus. In the more common bimanual technique, a second instrument is inserted into the anterior chamber and is used to manipulate the lens in combination with the phaco tip until a superior pole of the nucleus prolapses anteriorly into the iris plane, whereupon the prolapsed portion is emulsified. The second instrument then rotates successive portions of the nuclear periphery to the phaco tip where emulsification occurs. Eventually, the residual nucleus, now much reduced in diameter, prolapses spontaneously into the anterior chamber, and the phacoemulsification can be completed. Thereafter, the phaco tip is removed and replaced by an irrigation/aspiration tip for clean up and removal of any remaining cortex and any debris on the posterior lens capsule. If indicated, a lens implant insertion can then be initiated. Under the posterior chamber emulsification technique, endothelial cell loss improves from the anterior chamber value of 34% to a 9% loss rate.

Phacoemulsification is a procedure that is very demanding of the surgeon in terms of both surgical skill and intraoperative vigilance. A surgeon skilled in the ICCE and ECCE techniques is not automatically skilled in phaco surgery. The margin for error in KPE is small, for example, extending the initial incision 1 mm too long makes it difficult to maintain the anterior chamber in KPE, but would be irrelevant in ICCE or ECCE. A phaco surgeon must receive instructions regarding the technique and must be able to repeatedly practice the motor coordination skills required to manipulate and emulsify a lens through incisions of small chord length using both hands with equal dexterity. The advent of new intraocular lens designs, such as the "foldable" and "injectable" lenses, has further enhanced the value of KPE, since, for the first time both the cataract lens removal and the new lens replacement can be accomplished through the smaller incision that KPE affords.

The phacoemulsification technique by its very nature complicates the lens phantom-selection process. Not only is it necessary to duplicate the general ocular structure to enable practice in a simulated, controlled environment, it is also necessary to duplicate the "texture" of the cataract. If the lens phantom is unable to duplicate the ability of a cataractous lens to be emulsified and the reactions of a cataractous lens to mechanical displacement within the lens capsule as exists in a typical patient, the value of the phantom for providing phacoemulsification practice is severely reduced.

Such shortcomings are readily illustrated by the presently used animal eyes, (e.g., geese, rabbits, cows and pigs). The overall eye structure is only generally similar to a human eye. These animals, at the time of slaughter, or, when used while still alive, do not have developed cataracts. The soft lenses cannot be used to adequately demonstrate the emulsification and rotation techniques required by posterior chamber KPE. In addition, anatomical problems that are aggravated by tissue storage include corneas that are cloudy, tissue that is too tough, and chambers that are difficult to keep from collapsing.

The texture/density of some cataractous lenses resembles that of carrots, and some surgeons have resorted to the implantation of carrot disks in a silicone practice eye (Sheets Design), presently sold by the McGhan Medical Corporation Division of 3M Company. The McGhan eye was designed to enable practice of the techniques required for replacement lens implantation, and is wholly unsuited for the practice of KPE procedures. The McGhan eye has no lens and, equally as important, has no lens capsule—nor a provision for one. Additionally, the carrot discs clog the Phaco aspiration port and tubing because they are not water soluble.

SUMMARY OF THE INVENTION

The present invention has, as an underlying objective, the improvement in the known ophthalmic phantoms by utilizing a simulated lens that duplicates the texture of a cataractous lens and its ability to be mechanically rotated within a simulated lens capsule. In addition to enabling the use of the actual surgical equipment to aspirate the "emulsified" phantom lens without the danger of clogging or otherwise ruining the machine.

This goal is inventably achieved by encapsulating a structured, water-sensitive composition within an outer, vinyl or vinylidene chloride copolmyer capsular wall. The water solubility enables dissolution by phacoemulsification. By anchoring the outer capsular bag within an inner eye structure, the inner cataract phantom will be retained in a manner permitting the mechanical manipulations required to simulate KPE techniques. The ophthalmologic system is completed by providing an appropriately formed, simulated eye to receive the encapsulated cataract phantom and a head casting or face mask in which the eye is supported and on which the surgeon can obtain the hand positioning required for this delicate operation.

The surrounding base for the simulated eye consists of an outer orb, with an inner sealed posterior chamber, filled with a gel-like substance, used to simulate the vitreous body. A central opening is formed in the upper portion of the orb, with a shelf provided in the opening to receive a peripheral edge of the encapsulated lens phantom. The simulated cornea and iris are joined together to form the outer closure and are received within the orb opening in a manner that places the peripheral edge of the lens capsule between the cornea/iris cap and the orb shelf. In this manner, the lens capsule is anchored, with the inner lens restrained only as is it generally held by and within the outer capsule.

Various other objects, advantages, and features of the present invention will become readily apparently from the ensuing detailed description, and the novel features will be particularly pointed out in the appended claims.

BRIEF DESCRIPTION OF THE DRAWINGS

FIG. 1 is an exploded perspective view, with portions in phantom, showing the simulated eye structure in accordance with the present invention;

FIG. 2 is an exploded perspective view showing the simulated cornea and iris cap in accordance with the present invention;

FIG. 3 is an exploded, partial side elevational view, in section, showing a disassembled simulated eye, including a cataract phantom, in accordance with the present invention;

FIG. 4 is a view similar to FIG. 3 showing the simulated eye as assembled in accordance with the present invention;

FIG. 5 is a perspective view showing the simulated eye structure in accordance with the present invention as placed within a facial mask;

FIG. 6 is a partial side elevational view, in section, taken substantially along the lines 6—6 of FIG. 5, showing the simulated eye-receiving socket in the facial mask, in accordance with the present invention.

DESCRIPTION OF THE PREFERRED EMBODIMENT

Figure 7:
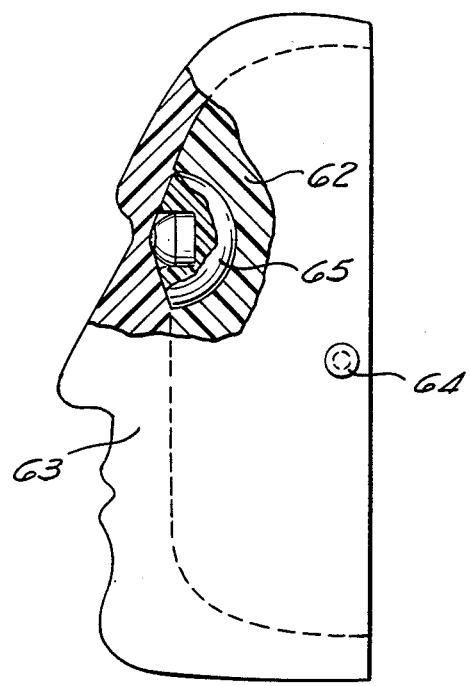
FIG. 7 is a partial side elevational view, with portions in section and portions broken away, showing a two-piece facial casting in accordance with the present invention.

The present invention relates to a phantom designed to partially simulate many of the structural characteristics of a cataractous eye. In an effort to avoid unnecessary confusion in describing the structure of this phantom, the commonly used anatomical terms will be referred to in describing the individual elements making up the ocular phantom.

To recreate/simulate the various structures and cavities of a human eye, a number of elements are fitted together within a surrounding outer orb 5. Formed in a flattened spheroid shape, the orb 5 is provided with an aperture 8 at a flattened portion thereof, with the aperture 8 communicating between the exterior of the orb 5 and a chamber 11 formed within the orb 5. The aperture 8 has a shelf 14 formed therein, of a size that cooperatively receives a posterior membrane 17, thereby sealing the chamber 11. The central portion of the posterior membrane 17 is concave towards the chamber 11, and is suitable towards receiving a double convex-shaped encapsulated lens 21. The ocular simulation is completed by an outer corneal cap 23.

As shown by FIG. 2, the corneal cap 23 in fact consists of two separate membranes, an outer cornea 26 and an iris 29 that is receivable within an inner surface of the cornea 26. As is the case with a human iris, a central opening or pupil 33 is formed therein, and in the case of the present invention, is designed to simulate a dilated pupil, which is the opening through which the cataract removal technique is performed. To assist the surgeon in this regard, every effort is made to completely dilate the pupil. However, responsiveness to the dilating drugs can vary, and to enable surgeons to practice the techniques required for such an eventuality, the iris 29 may be provided with pupil openings of varying sizes, such as 5, 7½, and 9½ mm.

For purposes of simulation, it is preferred that the cornea 26 be flexible and moisture tight. An appropriate material for the cornea 26 is a molded, clear and transparent silicone, 40–50 shore D. Likewise, a preferred composition for the iris portion, resulting in a less rigid construction, is a high elongation, molded silicone that is appropriately pigmented. Although the present lens phantom system is designed to teach posterior chamber KPE, it is also possible to practice the techniques of anterior chamber KPE, in which case the iris 29 can be constructed out of materials more closely simulating the mechanical properties of a human iris. For ease of fabrication, the iris 29 and the cornea 26 may be bonded together subsequent to their original manufacture, and thereafter be utilized in conjunction with the ocular simulation as the unitary corneal cap 23.

As shown best in FIG. 3, each of the individual ocular elements is arranged to receive and be received in a compact, stacked manner. A posterior membrane ledge 37 is formed about the periphery of the posterior membrane 17 and is received by the shelf 14 within the aperture 8. The peripheral edge of the encapsulated lens 21 is likewise flattened and mates with the flattened peripheral edge of the posterior membrane 17 when both are received within the aperture 8. The simulated anterior and posterior chambers are completed by the corneal cap 23, which is likewise received within the aperture 8. A flattened lower edge 41 of the corneal cap 23 is received and supported by the orb shelf 14, with an inner corneal wall 43 of sufficient diameter to receive both the encapsulated lens 21 and the posterior membrane 17 when the lower corneal edge 41 abuts the orb shelf 14. In this manner, the encapsulated lens 21 is securely retained about its peripheral edge between the corneal cap 23 and the posterior membrane 17, which is itself attached to the shelf 14 of the orb 5 (also see FIG. 4).

The chamber 11 corresponds generally to the vitreous in a human eye. The simulation under the present invention is further obtained by providing a vitreous body 47 within the chamber 11. Any type of viscous fluid can function as the vitreous body 47, and a silicone gel is certainly appropriate. Whichever material is selected, the vitreous body 47 is maintained in place within the chamber 11 by the posterior membrane 17, which, in a preferred embodiment, is adhesively attached to the shelf 14. To enable the surgeon to monitor progress utilizing the red reflex, it is preferred to color either the vitreous body 47 or the back wall of the chamber 11, with red the appropriate color in either circumstance.

As is best shown in FIG. 3, the encapsulated lens 21 consists of a clear, outer capsular wall 51, such as a vinyl film (e.g., saran) or vinylidene chloride copolymer film, and an inner cataract phantom 53, composed of a structured, water-soluable composition, designed to be similar to that found in the natural occurring cataract. In order to retain the same emulsification characteristics under the phaco instrument, a permanent hydrogel material is provided utilizing a cross-linked gelatin. This material is "hydrated" or provided with the proper water sensitivity by the incorporation of a water-soluable polymer, such as sodium alginate or a guar gum— e.g., Gelactasol 211 manufactured by the Henkel Corporation, Minneapolis, Minn.

The term "cataract" merely refers to a lens suffering some degree of opacity. The cataractous lens can vary from being soft to extremely hard as maturity increases. The soft and runny phase exists typically in only very advanced stages (hyper-mature), and such patients are exceedingly rare. Eye surgeons must normally contend with cataracts varying from very hard to merely soft, and the techniques required under phacoemulsification will understandably differ according to the "hardness" of the cataract. A soft cataract is much easier to emulsify, but can be more difficult to manipulate. On the other hand, a cataract can become sufficiently hard that it tends to fragment rather than to emulsify. In such an event, the damage to the endothelial cornea cells of the eye suffered by rebounding pieces of lens, in addition to the prolonged intraoculare phaco-time, was traditionally sufficient to warrant converting mid-operation to a different technique for cataract removal, i.e., ECCE. The advent of viscoelastic coating materials for the inner surface of the cornea has lessened the necessity for converting to a non-phacoemulsification method. These materials are sold under various trade names such as "Healon," "Viscoat," and "Amvisc," and may be used with the present ocular phantom system to enable the surgeon to practice the technique of performing Phaco in the presence of these substances, and PKE on a hard lens using such coating materials.

Under the present invention, the hardness of the phantom cataract is controlled by the addition of fillers such as 50 to 200 micron-sized glass beads or 50 to 200 micron organic fillers having solubilities of less than 5% in water, such as tetramethyl-1,3-cyclobutanediol. Alternatively, phantom "soft" cataracts can be prepared without gelatin using a calcium chloride, cross-linked sodium alginate. It is important that the phantom cataracts resemble human cataracts both in emulsification characteristics, (or "disintegration characteristics" for whichever removal technology is employed), and in translucency to ensure that the simulation will be as close to an actual removal procedure as is possible.

The following examples illustrate some preferred embodiments of the present invention:

A stock solution of 26% gelatin in water was prepared by heating the following to 40° C.: 0.1% Hyamin, 0.1% sodium benzoate, and 0.005% methyl orange.

EXAMPLE 1

SOFT CATARACT

| Reagent | Parts by Weight |
| --- | --- |
| Gelatin stock solution | 1 |
| Sodium alginate (5% aqueous solution) | 2 |
| Water | 5 |
| Formalin | 0.2 |

After cooling, the resulting material provided an excellent simulation of a soft cataract.

EXAMPLE 2

MEDIUM-HARD CATARACT

| Reagent | Parts by Weight |
| --- | --- |
| Gelatin stock solution | 1 |
| Sodium alginate (5% aqueous solution) | 5 |
| Tetramethyl-1,3-cyclobutanediol | 2 |
| Formalin | 0.2 |

This material, after cooling, provided a simulation of a medium-hard cataract.

EXAMPLE 3

HARD CATARACT

| Reagent | Parts by Weight |
| --- | --- |
| Gelatin stock solution | 1 |
| Sodium alginate (5% aqueous solution) | 3 |
| Tetramethyl-1,3-cyclobutanediol | 5 |
| Formalin | 0.2 |

After cooling, this material provided an adequate simulation of a hard cataract.

Regardless of the material used to form the cataract phantom 53, once placed in the assembled form for simulating the human eye, as shown in cross-section in FIG. 4, this simulated ocular system is ready for use by one desiring to practice the phacoemulsification technique or any other technique that makes use of a cataract or lens capsule, such as the small incision implants.

In a preferred embodiment, the completed ocular system is placed within a casting 57 that is generally designed to resemble a human head. As is shown in FIG. 6, a socket 61 is formed within the casting 57, and receives the simulated ocular system. In an embodiment shown in FIG. 7, a two-piece casting is utilized to enable the variable positioning of the ocular system. An inner casting 62 is received within an outer mask 63, with fastening means such as one or more pins 64 (only one shown) used to maintain the inner casting 62 and the outer mask 63 in a nested relationship. The angular position of the ocular system with respect to the outer mase 63 can be preset or a rotating insert 65 may be provided as part of the inner casting 62. In such circumstances, the ocular system may be placed in selectively rotated positions with respect to the adjacent non-rotating portions of the inner casting 62 and the outer mask 63. In this manner, the angular positioning of the ocular system can be varied, which resembles the variations possible during actual operations to assist the surgeon in performing many of the removal techniques. One of such techniques is schematically demonstrated in FIG. 5. A surgeon's hand 66 is resting upon the casting 57 in a manner permitting the manipulation of an emulsification tool 68 according to a particular cataract removal technique. The emulsification tool 68 can be an ultrasonic tip, but, of course, the present invention is not limited to the precise mechanism of lens emulsification or disintegration, and any other technology resulting in lens destruction would be appropriate, e.g., lasers. In any event, the preferred embodiment provides a preformed incision in the cornea 26 to allow for the proper tension in the cornea, and to limit the opening to a specific size, 3 mm is traditional for KPE, but other opening dimensions are possible depending upon the application. The posterior chamber phacoemulsification technique may then be performed through the pupil 33 in the iris 29. The outer capsular wall 51 (the anterior lens membrane) is removed and the cataract phantom 53 subsequently emulsified and removed through aspiration.

While we have disclosed exemplary structures to illustrate the principles of the present invention, it should be understood that we wish to embody within the scope of the patent warranted hereon, all such modifications as reasonably and properly come within the scope of our contribution to the art.

We claim:

1. A simulated ocular system comprising:
   an outer orb having an aperture formed in the outer surface of said orb and a chamber located within said orb, said aperture and said chamber in communication with one another;
   a posterior membrane attached to said chamber and forming a fluid-tight seal between a portion of the chamber and said aperture;
   a corneal cap attached to said orb adjacent said aperture and in a manner substantially sealing same; and
   a cataractous lens phantom releasably attached to said orb within the chamber, and located between said posterior membrane and said corneal cap, the lens phantom comprising a permanent hydrogel material incorporating a water-soluble polymer encapsulated within a transparent film, with the permanent hydrogel material comprising a cross-linked gelatin, the water-soluble polymer comprising sodium alginate, and said transparent film selected from the group consisting of vinyl and vinylidene chloride copolymer.

2. A simulated ocular system as described in claim 1, wherein said corneal cap further comprises a cornea membrane and an iris membrane.

3. A simulated ocular system as described in claim 2, and further comprising a filler appropriate to control the hardness of the cataractous lens phantom.

4. A simulated ocular system as described in claim 3, wherein said filler comprises 50 to 200 micron-sized glass beads.

5. A simulated ocular system as described in claim 4, wherein said filler comprises 50 to 200 micron-sized organic fillers having less than 5% solubility in water.

6. A simulated ocular system as described in claim 5, wherein tetramethyl-1,3-cyclobutanediol is selected as the organic filler.

7. A practice eye for the in vitro simulation of cataract removal by emulsification comprising:
   an orb having three connected inner chambers formed therein, a first chamber lying between an iris membrane and a corneal membrane and corresponding to an anterior chamber in a human eye, a second chamber lying between said iris membrane and a posterior membrane and corresponding to a posterior chamber in a human eye, and a third chamber, separated from said second chamber by the posterior membrane and corresponding to the vitreous cavity in a human eye; and a cataractous lens phantom releasably attached to said orb within said second chamber, the lens phantom comprising a permanent hydrogel material incorporating a water-soluble polymer encapsulated within a transparent film, with the permanent hydrogel material comprising a cross-linked gelatin, the water-soluble polymer comprising sodium alginate, and said transparent film selected from the group consisting of vinyl and vinylidene chloride copolymer.

8. An improved simulated ophthalmic system for practicing surgical techniques, of the type consisting of an orb having an inner chamber and a corneal membrane sealing an aperture formed in the surface of said orb, the aperture also communicating with said chamber, wherein the improvement comprises a cataractous lens phantom releasably retained within said chamber, the lens phantom comprising a permanent hydrogel material incorporating a water-soluble polymer encapsulated within a transparent film, with the permanent hydrogel material comprising a cross-linked gelatin, the water-soluble polymer comprising sodium alginate, and said transparent film selected from the group consisting of vinyl and vinylidene chloride copolymer.

9. An improved simulated ophthalmic system as described in claim 8, and further comprising a plurality of membranes located between said corneal membrane and said chamber.

10. An improved simulated ophthalmic system as described in claim 9, wherein said plurality of membranes comprise a first iris membrane and a second posterior membrane, and wherein said cataractous lens phantom is retained between said iris membrane and said posterior membrane.

11. An improved simulated ophthalmic system as described in claim 10, wherein said permanent hyrdogel material incorporating a water soluble polymer comprises a stock solution of gelatin, an effective amount of sodium alginate and further comprises a preselected amount of fillers, said fillers selected from the group consisting of 50 to 200 micron-sized glass beads or 50 to 200 micron-sized organic fillers of the type having solubilities of less than 5% in water.

12. An improved simulated ophthalmic system as described in claim 11, wherein said organic filler comprises tetramethyl-1,3-cyclobutanediol.linked sodium alginate.

13. An improved simulated ophthalmic system for practicing surgical techniques, of the type consisting of an orb having an inner chamber and a corneal membrane sealing an aperture formed in the surface of said orb, the aperture also communicating with said chamber, wherein the improvement comprises a cataractous lens phantom releasably retained within said chamber, the lens phantom comprising a structured, water-sensitive composition enclosed by an outer capsular wall of a transparent film, with said water-sensitive composition comprising a calcium chloride, cross-linked sodium alginate.

14. A practice lens for use in training surgeons the removal of the lens in a human eye, comprising:

a synthetic lens of double convex shape formed of a material that simulates the natural lens of a human eye, said material comprising a permanent hydrogel material incorporating a water-soluble polymer, with the permanent hydrogel material comprising a cross-linked gelatin and the water-soluble polymer comprising sodium alginate;

a thin synthetic capsule surrounding and supporting said synthetic lens, but permitting said synthetic lens to be repositioned by said surgeon within said capsule during said removal; and a base supporting said capsule during said removal.

15. A practice lens as described in claim 14, wherein said base supports said capsule by suspending said capsule from a circular perimeter.

16. A practice lens as described in claim 14, wherein said lens is translucent.

17. A practice lens as describe in claim 14, wherein said capsule is flexible.

* * * * *